(12) United States Patent
Nagai (10) Patent No.: US 7,220,929 B2
(45) Date of Patent: May 22, 2007

(54) VEHICLE INTERIOR ILLUMINATION LAMP (75) Inventor: Kentaro Nagai, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/176,295

(22) Filed: Jul. 8, 2005

(65) Prior Publication Data
US 2006/0006053 A1    Jan. 12, 2006

(30) Foreign Application Priority Data
Jul. 8, 2004    (JP) ............................ P2004-202164

(51) Int. Cl.
H01H 1/36     (2006.01)
(52) U.S. Cl. ...................................... 200/252; 200/530
(58) Field of Classification Search ................ 200/252, 200/530, 547, 531, 536
See application file for complete search history.

(56) References Cited
U.S. PATENT DOCUMENTS 3,187,132 A * 6/1965 Dennison .................... 200/461
4,931,605 A * 6/1990 Zoller ......................... 200/408
6,930,264 B2 * 8/2005 Nagai et al. ................. 200/252
2002/0027783 A1   3/2002 Nagai

FOREIGN PATENT DOCUMENTS

| DE | 8702343 U1 | 5/1987 |
| DE | 3704811 C1 | 5/1988 |
| DE | 10148107 A1 | 10/2002 |
| JP | 2002-79879 A | 3/2002 |

* cited by examiner

Primary Examiner—Michael Friedhofer
Assistant Examiner—Lisa Klaus
(74) Attorney, Agent, or Firm—Sughrue Mion, PLLC (57) ABSTRACT

A vehicle interior illumination lamp for mounting at an opening portion formed in a roof panel (interior member) of a vehicle includes a function part including a bulb (light source), and a switch unit for supplying and interrupting electric power relative to the bulb, and a design part including a housing for mounting at the opening portion in the roof panel, a retaining mechanism securely engaging the function part with the housing, and a switch knob engaged with the switch unit. The retaining mechanism includes a retaining member which cooperates with the switch knob to hold the switch unite therebetween.

4 Claims, 6 Drawing Sheets

VEHICLE INTERIOR ILLUMINATION LAMP

BACKGROUND OF THE INVENTION

1. Field of the Invention

This invention relates to a vehicle interior illumination lamp for mounting within a room of a vehicle.

2. Related Art

Generally, a vehicle has an interior illumination lamp mounted on a ceiling thereof.

Figure 7:
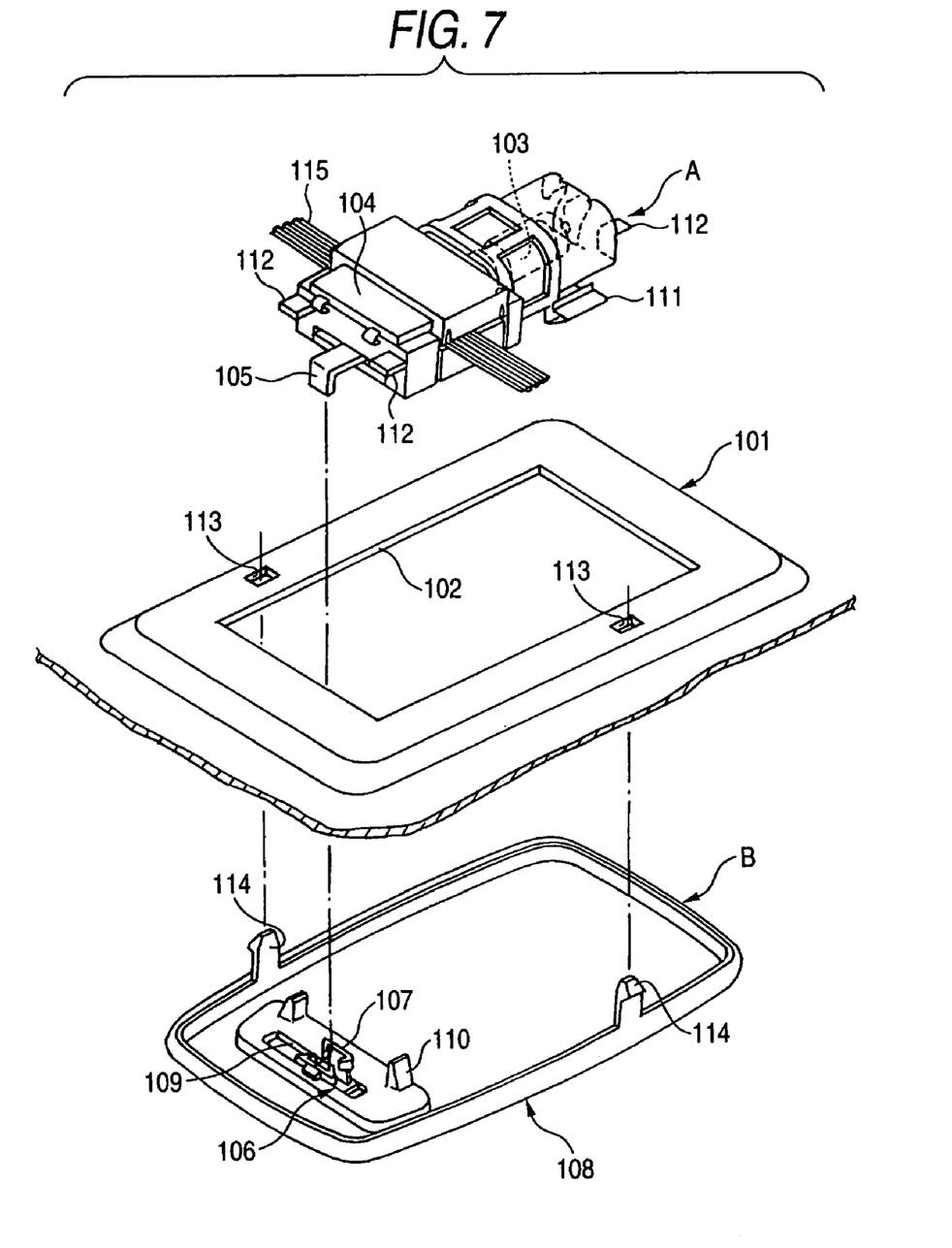
FIG. 7 is an exploded, perspective view of a conventional vehicle interior illumination lamp.

As shown in FIG. 7, one such known interior illumination lamp comprises a function part A which is attached to a roof panel (interior member) 101 (covering a vehicle body panel (note shown)) from that side facing a vehicle body panel, and is partially exposed to the inside of a vehicle room through an opening portion 102 in the roof panel 101, and a design part B which is attached to the roof panel 101 from the inside of the vehicle room to cover the opening portion 102, and is combined with the function part A (see, for example, JP-A-2002-79879 (Pages 15 to 17, FIG. 19)).

The function part A includes a bulb 103 serving as a light source, and a switch unit 104 for supplying and interrupting electric power relative to the bulb 103. A cable 115, such as an FFC (flexible flat cable), is connected to a cable connection portion (not shown) of a switch circuit of the switch unit 104. A switch lever 105 for supplying and interrupting electric power relative to the bulb 103 is provided at the switch unit 104.

A pair of elastic retaining piece portions 111, formed respectively on opposite side portions of the function part A, are brought into engagement with a peripheral edge portion of the opening portion 102 from the inside of the vehicle room, and at the same time a plurality of support projecting piece portions 112, formed at front and rear ends of the function part A, are brought into abutting engagement with the peripheral edge portion of the opening portion 102 from that side facing the vehicle body panel, thereby mounting the function part A on the roof panel 101.

The design part B includes a housing 108 which is formed into a light-transmitting lens-like configuration, and has retaining projections 114, and this housing 108 is attached to the root panel 101 to cover the opening portion 102 from the inside of the vehicle room, with the retaining projections 114 engaged respectively in engagement holes 113 formed in the peripheral edge portion of the opening portion 102.

A switch knob 106 is mounted in a suspended manner on the housing 108 through a pair of retaining claws engaged with that surface of a peripheral edge portion of a slide groove 109 facing the vehicle body panel, so that the switch knob 106 can slidingly move along the slide groove 109. A pair of limitation projections 110 are formed on and project from the housing 108, and are disposed adjacent to the slide groove 109 in the housing 108, and these limitation projections 110 hold the switch unit 104 therebetween in the direction of sliding movement of the slide knob 106 so as to prevent the switch unit 104 (the function part A) from being displaced relative to the housing 108 in the direction of sliding movement of the slide knob 106

The function part A and the design part B are combined together through the roof panel 101, and in this condition the switch knob 106 of the design part B is engaged at its engagement portion 107 with the switch lever 105 of the switch unit 104. When the switch knob 106 is pressed or operated in its sliding direction, the switch lever 105 is moved in unison with the switch knob 106 so as to supply and interrupt electric power relative to the bulb 103.

In the vehicle interior illumination lamp disclosed in the above Patent Literature 1, the switch unit 104 (which directly receives a pressing force when the switch knob 106 is pressed or operated) is prevented merely by the pair of limitation projections 110 on the housing 108 from displacement in the direction of sliding movement of the switch knob 106. Namely, that side or surface of the switch unit 104, facing the vehicle body panel, is not directly held by either of the roof panel 101 and the housing 108 of the design part B. Therefore, in case an urging force, urging the switch knob 106 toward the switch unit 104, is applied when the switch knob 106 is operated, there has been a possibility that the switch unit 104, directly receiving this pressing force, is displaced toward the vehicle body panel, that is, in a direction away from the housing 108, so that the whole of the function part A is disengaged from the design part B (that is, the function potion A is brought out of engagement with the roof panel 101).

When the function part A is thus disengaged from the design part B, the engagement of the switch lever 105 with the switch knob 106 is canceled, and therefore the switch lever 105 can not be operated through the switch knob 106, thus inviting a so-called malfunction, that is, a failure to supply and interrupt electric power relative to the bulb 103.

And besides, there has been a fear that the function part A and the design part B are improperly assembled together in a process of mounting of the interior illumination lamp on the vehicle, since the function part A is liable to be disengaged from the design part B when the switch knob 106 is pressed toward the vehicle body panel.

SUMMARY OF THE INVENTION

This invention has been made in view of the above circumstances, and an object of the invention is to provide a vehicle interior illumination lamp which prevents a malfunction and an improperly-assembled condition, thereby enhancing its quality.

According to one aspect of the invention, there is provide a vehicle interior illumination lamp in a compartment of a vehicle, comprising:

a function part including a light source and a switch unit for supplying and interrupting electric power relative to the light source;

a design part including a housing to be mounted on an opening portion of a panel, a retaining mechanism securely engaging the function part with the housing and a switch operating portion engaged with the switch unit; and wherein the retaining device includes a retaining member which cooperates with the switch operating portion to hold the switch unit therebetween.

In the above vehicle interior illumination lamp, the switch unit may include a switch body projecting from a side of the switch unit in which a switch lever is accommodated slidingly along a sliding direction, and the retaining device may have a pair of retaining hooks extending from a base board of the housing and a retaining member provided between distal ends of the retaining hooks so as to extend in the sliding direction.

According to another aspect of the invention, there is provided a vehicle interior illumination lamp attached on a panel of a compartment in a vehicle, comprising:

a function part having a light source, a wire supplying electrical power, and a switch body connected to the wire; and a design part having a switch operating portion to face to the function part and an engagement projection;

the function part and the design part are fitted to each other from opposite sides with respect to the panel so that the switch body and the switch operating portion are securely engaged to each other.

In the above vehicle interior illumination lamp as described above, the switch operation portion may have an engagement portion for receiving a convex portion of a switch lever provided in the switch body of the function part, and the engagement portion may be formed between opposed distal end portions of a pair of elastic retaining lances which extend in a sliding direction of the switch operating portion, so that the distal end portions of the pair of elastic retaining lances can hold a distal end portion of the convex portion. therebetween in the sliding direction, thereby retaining the switch lever.

The retaining member is spaced a predetermined distance from the switch operating portion in opposed relation thereto, and the switch unit is fitted into this space, so that the switch unit is engaged with the switch operating portion, and also is supported by the retaining member at the rear side of its engagement portion engaged with the switch operating portion.

Therefore, even when the switch operating portion is pressed toward the switch unit, the switch unit, supported by the retaining member, will not be displaced in a direction away from the housing. Therefore, the function part and the design part can be positively assembled together, and a malfunction and an improperly-assembled condition of the vehicle interior illumination lamp are avoided, so that the quality can be enhanced.

In the present invention, the quality of the vehicle interior illumination lamp can be enhanced by preventing a malfunction and an improperly-assembled condition.

The present invention has been briefly described above. Details of the invention will become more manifest upon reading the following Section "Best Mode for Carrying Out the Invention" with reference to the accompanying drawings.

DETAILED DESCRIPTION OF THE PREFERRED EMBODIMENTS

Figure 1:
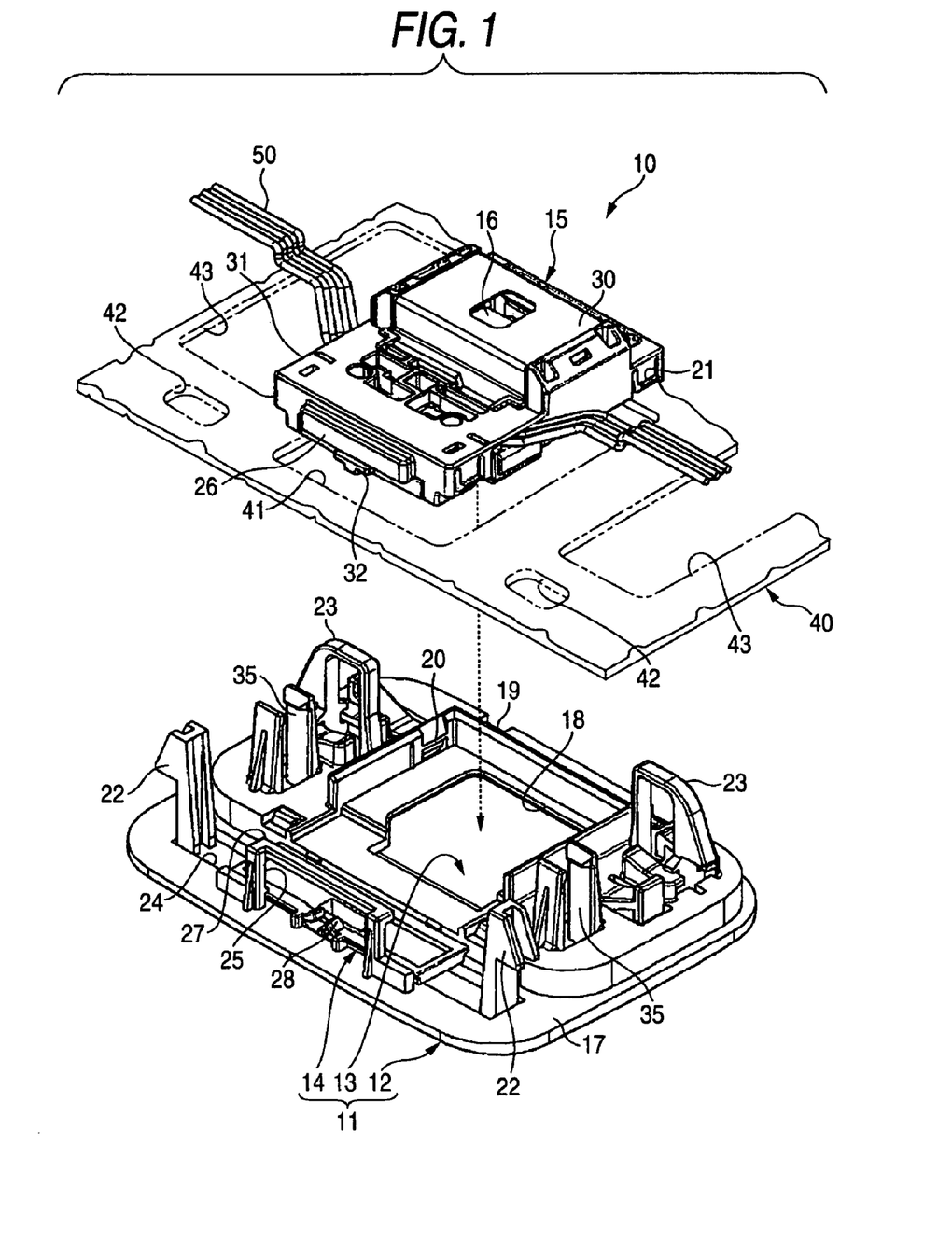
FIG. 1 is an exploded, perspective view of one preferred embodiment of a vehicle interior illumination lamp of the present invention.
Figure 2:
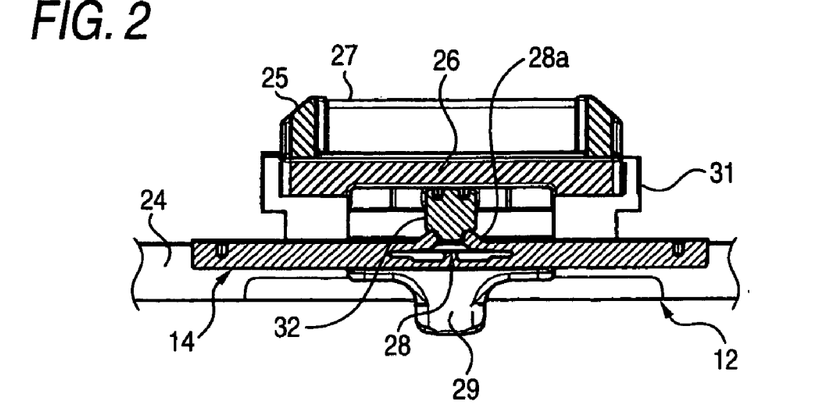
FIG. 2 is an enlarged cross-sectional view showing a switch unit and a switch knob shown in FIG. 1.
Figure 3A:
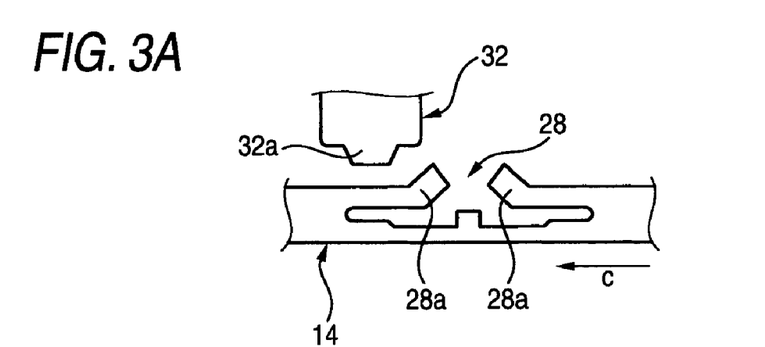
FIGS. 3A and 3B are schematic views explanatory of a method of engaging the switch unit and the switch knob of FIG. 2 with each other.
Figure 3B:
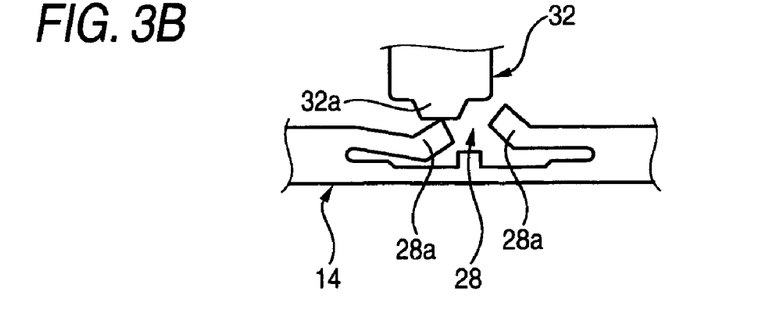
Figure 4:
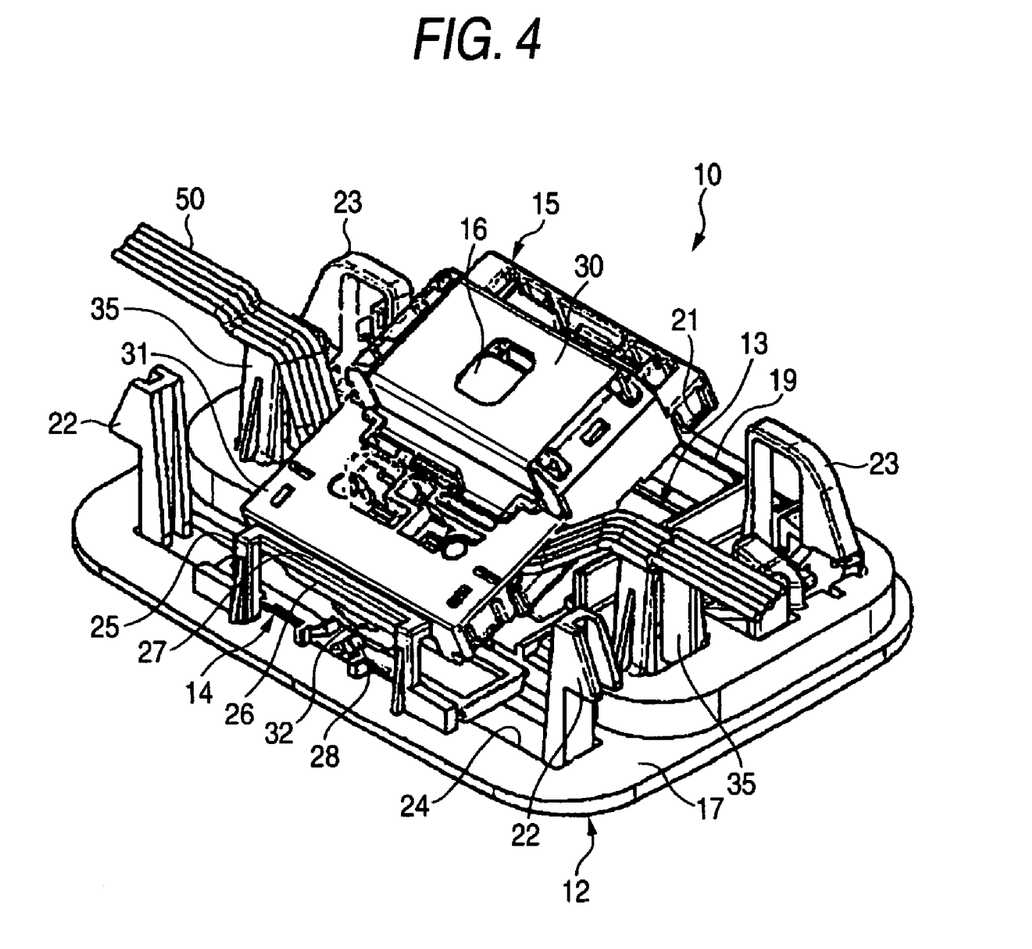
FIG. 4 is a perspective view which is explanatory of a procedure of assembling the vehicle interior illumination lamp of FIG. 1, and shows its appearance.
Figure 5:
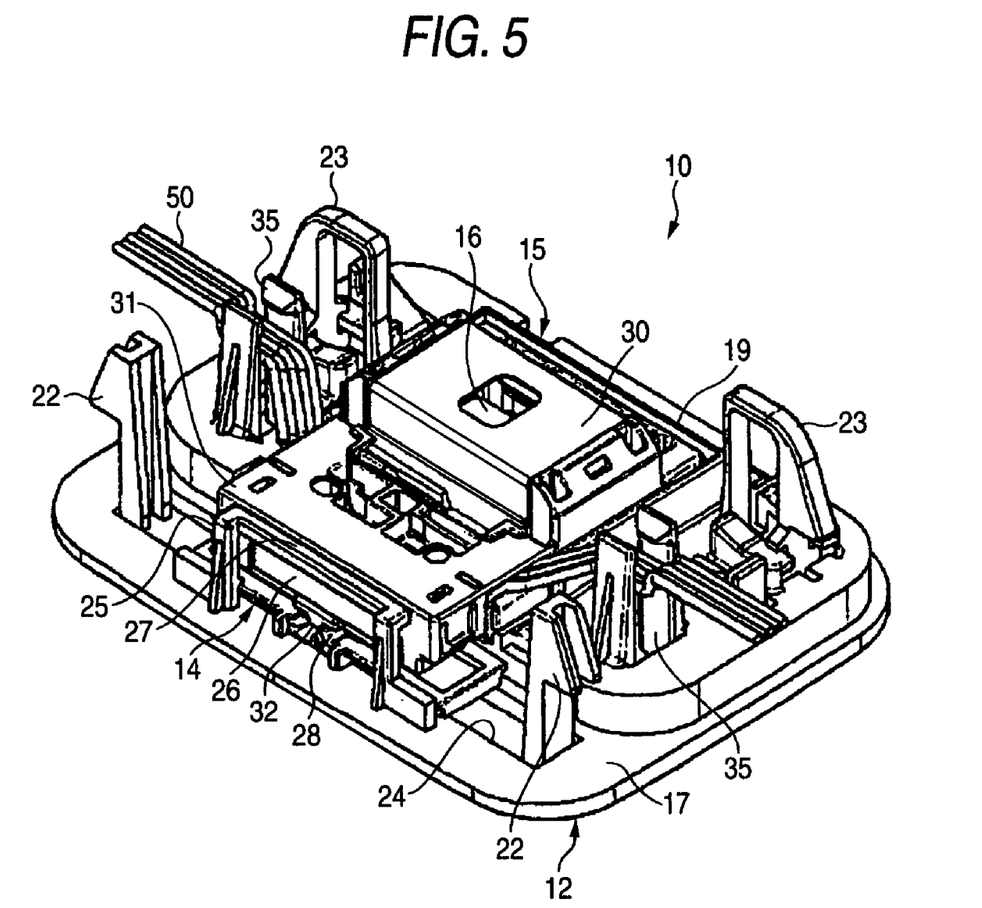
FIG. 5 is a perspective view of the vehicle interior illumination lamp of FIG. 1 in its completely-assembled condition, showing its appearance.
Figure 6:
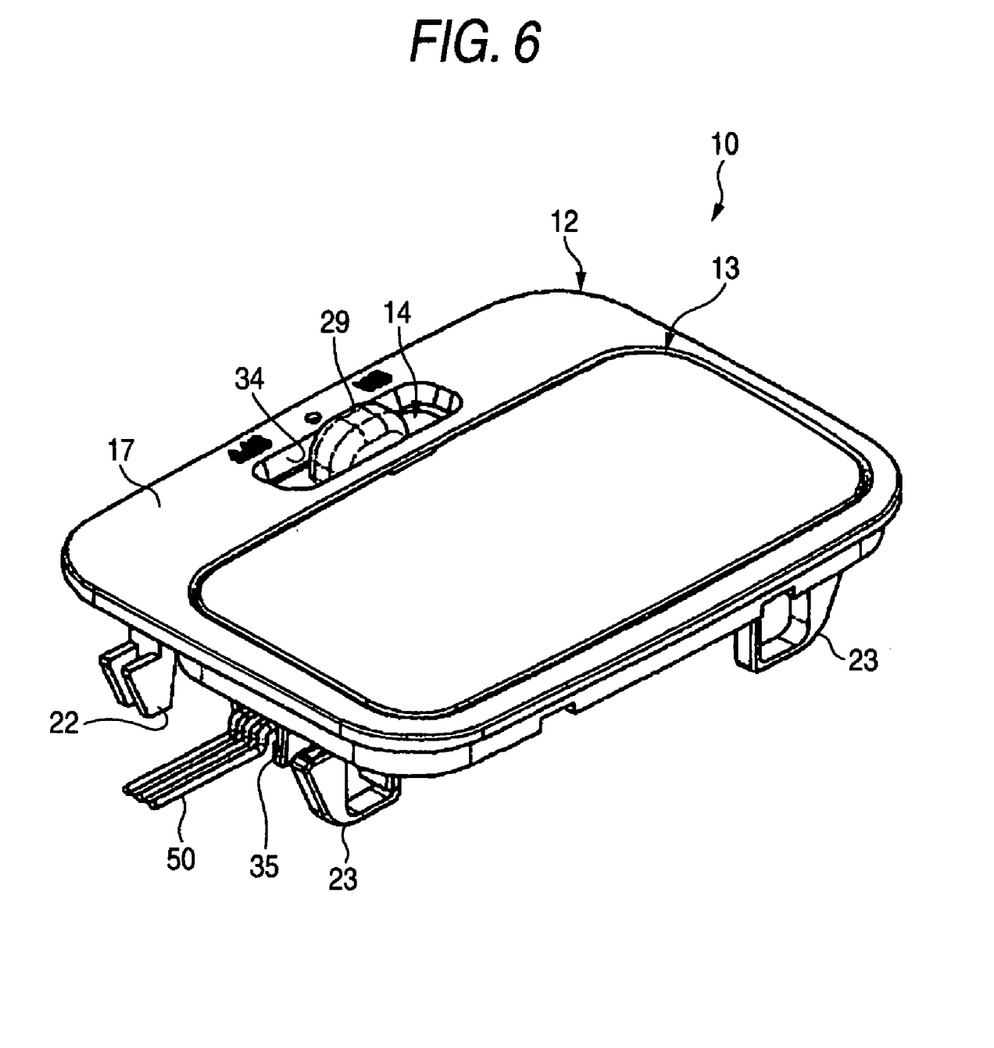
FIG. 6 is a perspective view of the vehicle interior illumination lamp of FIG. 1 as seen from a different angle, showing its appearance.

A preferred embodiment of the present invention will now be described in detail with reference to the drawings. FIG. 1 is an exploded, perspective view of one preferred embodiment of a vehicle interior illumination lamp of the invention, FIG. 2 is an enlarged cross-sectional view showing a switch unit and a switch knob (switch operating portion) shown in FIG. 1, FIGS. 3A and 3B are schematic views explanatory of a method of engaging the switch unit and the switch knob of FIG. 2 with each other, FIG. 4 is a perspective view which is explanatory of a procedure of assembling the vehicle interior illumination lamp of FIG. 1, and shows its appearance, FIG. 5 is a perspective view of the vehicle interior illumination lamp of FIG. 1 in its completely-assembled condition, showing its appearance, and FIG. 6 is a perspective view of the vehicle interior illumination lamp of FIG. 1 as seen from a different angle, showing its appearance.

As shown in FIG. 1, the vehicle interior illumination lamp 10, embodying the invention, comprises a design part 11 including a housing 12, a lens 13 and the switch knob 14, and a function part 15 including a bulb 16 serving as a light source. This lamp 10 is mounted at an opening portion 41 formed through a roof panel (interior member) 40 covering a vehicle body panel (not shown).

The function part 15 includes a function part body 30 receiving the bulb 16 such as a miniature bulb (eggplant-shaped bulb) and an LED, and the switch unit 31 which is disposed adjacent to the function part body 30, and supplies and interrupts electric power relative to the bulb 16. A wire harness 50 (such as an FFC (flexible flat cable)), connected to a power source, is connected to a cable connection portion (not shown) of a switch circuit of the switch unit 31, and by switching a contact (not shown) of the switch circuit, the supply of electric power to the bulb 16 can be effected and interrupted. The wire harness 50 is installed on that side of the roof panel 40 facing the vehicle body panel.

A switch base (switch body) 26 generally in the form of a pillar of a square cross-section is formed on and projects from that end surface of the switch unit 31 which is spaced from the function part body 30 in a direction of juxtaposition of the function part body 30 and the switch unit 31. A switch lever 32 of a generally convex shape is held on the switch base 26 so as to slidingly move along the above end surface of the switch unit 31. In accordance with the sliding movement of the switch lever 32, the contact of the switch circuit of the switch unit 31 is switched, thereby effecting and interrupting the supply of electric power to the bulb 16.

The housing 12 is the member for mounting the interior illumination lamp 10 on the roof panel 40, and an optical path opening 18 is formed through a central portion of a generally rectangular base board 17 of the housing 12. After the function part 15 is attached to the design part 11, light, emitted from the bulb 16 of the function part 15, passes through the optical path opening 18.

A mounting frame 19 of a generally U-shaped cross-section is formed on the base board 17 in surrounding relation to three sides of the optical path opening 18. When the function part 15 is to be attached to the design part 11, the mounting frame 19 is fitted on the function part body 30 (receiving the bulb 16) to position the function part 15 in such a manner that the function part body 30 is disposed just above the optical path opening 18. Retaining grooves (first retaining mechanism) 20 are formed respectively in inner surfaces of a pair of opposed side walls of the mounting frame 19, and are engaged respectively with a pair of retaining claws 21 and 21 (formed respectively on corresponding portions of the function part body 30), thereby retaining the function part 15 relative to the housing 12 of the design part 11.

A slide groove 24 is formed through that portion of the base board 17 which corresponds to the switch base 26 of the switch unit 31 of the function part 15 when the function part body 30 of the function part 15 is fitted into the mounting frame 19. The slide groove 24 is formed such that its longitudinal direction is parallel to the direction of sliding movement of the switch lever 32 held on the switch base 26. The switch knob 14 is held in the slide groove 24 so as to slidingly move therealong.

Referring to FIG. 2, the switch knob 14 has an engagement portion 28 which is engageable with the switch lever 32. The engagement portion 28 is formed between opposed distal end portions of a pair of elastic retaining lances 28a and 28a which extend in the direction of sliding movement of the switch knob 14. The distal end portions of the pair of elastic retaining lances 28a and 28a hold a distal end portion 32a of the switch lever 32 of a generally convex shape therebetween in the direction of sliding movement of the switch knob 14, thereby retaining the switch lever 32.

In case the switch lever 32 and the engagement portion 28 of the switch knob 14 are disposed out of registry with each other when the function part 15 is attached to the design part 11 as shown in FIG. 3A, the switch knob 14 is slidingly moved in such a direction (that is, a direction indicated by arrow C in this Figure) that the engagement portion 28 moves toward the switch lever 32. By doing so, the distal end portion 32a of the switch lever 32 is brought into abutting engagement with the elastic retaining lance 28a to elastically deform the same, and then is brought into engagement with the engagement portion 28.

Referring again to FIG. 1, a pair of first fixing means 22 and 22 and a pair of second fixing means 23 and 23 are formed on an outer peripheral portion of the base board 17. The first fixing means 22 and 22 are engaged respectively in corresponding engagement holes 42 formed in the root panel 40, thereby fixing the housing 12 to the roof panel 40. The second fixing means 23 and 23 pass respectively through corresponding through holes 43 formed through the roof panel 40, and are engaged with the vehicle body panel (not shown). Harness fixing portions 35 are formed between the first fixing means 22 and the second fixing means 23, and these harness fixing portions 35 grasp the wire harness 50 which extends through the through hole 43, and is installed on that side of the roof panel 40 facing the vehicle body panel.

As shown in FIGS. 1 and 2, second retaining mechanism for retaining the function part 15 relative to the housing 12 of the design part 11 is formed on that portion of the base board 17 opposite to the mounting frame 19, and is disposed adjacent to the slide groove 24. This second retaining mechanism comprises a pair of generally L-shaped retaining hooks 25 and 25 which are formed in an upstanding manner on the base board 17, and are spaced a predetermined distance from each other in the longitudinal direction of the slide groove 24, and a bar-like retaining member 27 extending between distal ends of the pair of retaining hooks 25 and 25. The retaining member 27 is spaced a predetermined distance from the switch knob 14 (held in the slide groove 24) in opposed relation thereto. When the function part 15 is attached to the design part 11, the retaining member 27 is engaged with an upper edge (facing the vehicle body panel) of the switch base 26 of the switch unit 31, and cooperates with the switch knob 14 to hold the switch base 26 therebetween.

Next, the procedure of attaching the function part 15 to the design part 11 will be described with reference to FIGS. 4 to 6. In FIGS. 4 to 6, for the sake of simplicity, the showing of the roof panel 40 is omitted.

First, the design part 11 is attached to the roof panel 40 from the inside of the vehicle room in such a manner that the first fixing means 22 are engaged respectively in the engagement holes 42 in the roof panel 40 while the second fixing means 23 and the harness fixing portions 35 pass through the through holes 43 in the roof panel 40.

Then, the function part 15, while kept inclined, is inserted into a mounting position (where it is attached to the design part 11) from that side of the roof panel 40 facing the vehicle body panel, and the upper edge portion of the switch base 26 of the function part 15 is engaged with the retaining member 27 on the housing 12 as shown in FIG. 4.

Then, the function part body 30 of the function part 15 is pressed toward the housing 12, with the switch base 26 of the function part 15 kept engaged with the retaining member 27, and as a result the function part 15 is turned or angularly moved about the retaining member 27 (which serves as a fulcrum at this time), and is inserted into the mounting frame 19, so that the pair of retaining claws 21 and 21 on the function part body 30 are engaged respectively in the pair of retaining grooves 20 and 20 in the mounting frame 19 as shown in FIG. 5. In this condition, the retaining member 27 is engaged with the upper edge portion of the switch base 26, and cooperates with the switch knob 14 to hold the switch base 26 therebetween. In case the switch lever 32 and the engagement portion 28 of the switch knob 14 are disposed out of registry with each other, the switch knob 14 is slidingly moved in such a direction as to move the engagement portion 28 toward the switch lever 32, thereby bringing the engagement portion 28 of the switch lever 14 into engagement with the switch lever 32.

Then, the wire harness 50, connected to the switch unit 31, is grasped by the harness fixing portions 35 on the housing 12. Thus, the operation for assembling the function part 15 and the design part 11 together is completed.

In the vehicle interior illumination lamp 10 in which the function part 15 is attached to the design part 11, an operating portion 29 of the switch knob 14 (of the design part 11) which is engaged with the switch lever 32 of the function part 15 projects into the inside of the vehicle room through a knob hole 34 formed in the housing 12 in continuous relation to the slide groove 24, as sown in FIG. 6. When the operating knob 29 is operated or pressed to be moved from an OFF position to an ON position, the switch knob 14 is slidingly moved, and in accordance with this movement of the switch knob 14, the switch lever 32 is operated, thereby supplying electric power to the bulb 16 to light the bulb 16. Similarly, when the operating portion 29 is pressed to be moved from the ON position to the OFF position, the switch lever 32 is operated, thereby interrupting the supply of electric power to the bulb 16 to turn off the bulb 16. Light, emitted from the bulb 16, is irradiated to the inside of the vehicle room through the optical path opening 18 (formed in the housing 12 of the design part 11) and the lens 13 provided at the housing 12 to cover the optical path opening 18.

In the above embodiment of the vehicle interior illumination lamp of the invention, the switch base 26, holding the switch lever 32 of the function part 15 which directly receives a pressing force when the switch knob 14 is operated or pressed, is held between the switch knob 14 of the design part 11 and the retaining member 27. In other words, the retaining member 27 is spaced the predetermined distance from the switch knob 14 in opposed relation thereto, and the switch base 26 of the switch unit 31 is fitted into this space, so that the switch base 26 is supported by the retaining member 27 at the rear side of the switch lever 32 serving as an engagement portion engaged with the switch knob.

Therefore, even when the switch knob 14 is pressed toward the switch base 26, the switch base 26, supported by the retaining member 27, will not be displaced in the direction away from the housing 12 of the design part 11. Therefore, the function part 15 and the design part 11 can be positively assembled together, and a malfunction and an improperly-assembled condition of the vehicle interior illumination lamp 10 are avoided, so that the quality can be enhanced.

The present invention is not limited to the above embodiment, and suitable modifications, improvement and so on can be made. The shape, dimensions, numerical values, form, number, disposition, etc., of each of the constituent elements of the above embodiment are arbitrary, and are not limited in so far as the invention can be achieved.

What is claimed is:

1. A vehicle interior illumination lamp in a compartment of a vehicle, comprising:
    a function part including a light source and a switch unit for supplying and interrupting electric power relative to said light source; and
    a design part including a housing to be mounted on an opening portion of a panel, a retaining device retaining said housing to said function part and a switch operating portion engaged with said switch unit;
    wherein said retaining device includes a retaining member which cooperates with said switch operating portion to hold said switch unit therebetween; and
    wherein said retaining device has a pair of retaining hooks extending from a base board of said housing and said retaining member provided between distal ends of said retaining hooks so as to extend in a sliding direction.

2. A vehicle interior illumination lamp according to claim 1, wherein said switch unit includes a switch body projecting toward a side of the switch unit in which a switch lever is accommodated slidingly along a sliding direction.

3. A vehicle interior illumination lamp attached on a panel of a compartment in a vehicle, comprising:
    a function part having a light source, a wire supplying electrical power, and a switch body connected to said wire; and
    a design part having a switch operating portion to face to said function part; wherein said function part and said design part are fitted to each other from opposite sides with respect to said panel so that said switch body and said switch operating portion are engaged to each other; and
    further comprising a retaining device having a pair of retaining hooks extending from a base board of said housing and a retaining member provided between distal ends of said retaining hooks so as to extend in said sliding direction, wherein said retaining member cooperates with said switch operating portion to hold said switch body therebetween.

4. A vehicle interior illumination lamp according to claim 3, wherein said switch operation portion has an engagement portion for receiving a convex portion of a switch lever provided in said switch body, and
    said engagement portion is formed between opposed distal end portions of a pair of elastic retaining lances which extend in a sliding direction of said switch operating portion,
    whereby said distal end portions of said pair of elastic retaining lances hold a distal end portion of said convex portion therebetween, thereby retaining said switch lever.

* * * * *